(12) United States Patent
Polster et al.

(10) Patent No.: US 9,883,627 B2
(45) Date of Patent: Feb. 6, 2018

(54) DEVICE FOR PICKING UP HARVESTED ROOT CROP

(71) Applicant: EXEL INDUSTRIES, Epernay (FR)

(72) Inventors: Sebastian Polster, Schierling (DE); Stephan Engl, Ihrlerstein (DE)

(73) Assignee: EXEL INDUSTRIES, Epernay (FR)

( * ) Notice: Subject to any disclaimer, the term of this patent is extended or adjusted under 35 U.S.C. 154(b) by 74 days.

(21) Appl. No.: 14/846,303

(22) Filed: Sep. 4, 2015

(65) Prior Publication Data

US 2016/0066502 A1 Mar. 10, 2016

(30) Foreign Application Priority Data

Sep. 5, 2014 (EP) ..................................... 14306373

(51) Int. Cl.
*A01D 45/02* (2006.01)
*A01D 33/10* (2006.01)

(52) U.S. Cl.
CPC .................................... *A01D 33/10* (2013.01)

(58) Field of Classification Search
CPC ...... A01D 43/082; A01D 41/14; A01D 45/26; A01D 57/02; A01B 73/044
USPC ..................................................... 172/58, 40
See application file for complete search history.

(56) References Cited

U.S. PATENT DOCUMENTS

| | | | | |
|---|---|---|---|---|
| 1,901,099 A * | 3/1933 | Hale | ...................... | A01D 45/02 56/102 |
| 2,654,209 A | 10/1953 | Raney et al. | | |
| 2,700,858 A * | 2/1955 | Bulfer | ..................... | A01F 11/06 56/103 |
| 3,508,387 A * | 4/1970 | Wright | ................... | A01D 41/14 56/95 |
| 3,584,444 A * | 6/1971 | Sammann | ............ | A01D 45/021 56/119 |
| 3,589,117 A * | 6/1971 | Wadsworth | ............ | A01D 45/26 171/38 |
| 3,919,830 A * | 11/1975 | Gerber | ................. | A01D 43/082 56/119 |
| 4,083,167 A * | 4/1978 | Lindblom | ............ | A01D 43/082 56/98 |

(Continued)

FOREIGN PATENT DOCUMENTS

| | | |
|---|---|---|
| DE | 2015226 A1 | 10/1971 |
| DE | 2828123 A1 | 1/1979 |

(Continued)

*Primary Examiner* — Arpad Fabian-Kovacs
(74) *Attorney, Agent, or Firm* — Thompson Coburn LLP; Steven M. Ritchey (57) ABSTRACT

A pick-up arrangement for picking up harvested crop, comprises a pick-up device which has a pick-up device frame defining a pick-up opening located on a pick-up side of the pick-up device and a pick-up member, located on the pick-up side and, adapted to pick-up harvested crop and defining a pick-up width, and a guiding device adapted to guide harvested crop located outside the pick-up width into the pick-up opening. The pick-up device defines a pick-up direction. The guiding device comprises a guiding device frame and a first guiding member extending outside the pick-up width, being rotatably mounted with respect to the guiding device frame, and being adapted to transport harvested crops located outside the pick-up width into the pick-up opening.

18 Claims, 5 Drawing Sheets

(56) References Cited

U.S. PATENT DOCUMENTS

| | | | | |
|---|---|---|---|---|
| 4,084,396 A * | 4/1978 | Fritz | A01D 43/082 | 56/157 |
| 4,106,270 A * | 8/1978 | Weigand | A01D 43/082 | 56/98 |
| 4,754,521 A | 7/1988 | Zoni | | |
| 5,329,753 A * | 7/1994 | Arnold | A01D 43/082 | 56/119 |
| 5,775,076 A * | 7/1998 | Mossman | A01D 45/021 | 56/119 |
| 5,845,472 A * | 12/1998 | Arnold | A01D 41/144 | 56/228 |
| 6,119,443 A * | 9/2000 | Rauch | A01D 45/021 | 56/119 |
| 6,925,790 B1 * | 8/2005 | Krone | A01B 73/044 | 56/51 |
| 7,419,048 B2 * | 9/2008 | Weiand | A01D 61/004 | 198/662 |
| 8,567,168 B2 * | 10/2013 | Allochis | A01D 63/02 | 56/109 |
| 2003/0041579 A1 * | 3/2003 | Wuebbels | A01D 41/144 | 56/15.2 |
| 2003/0226342 A1 * | 12/2003 | Boeckmann | A01D 45/021 | 56/14.7 |
| 2004/0107684 A1 * | 6/2004 | Slabbinck | A01D 63/00 | 56/119 |
| 2004/0123575 A1 * | 7/2004 | Rickert | A01D 41/144 | 56/14.7 |
| 2005/0109004 A1 * | 5/2005 | Duquesne | A01D 75/18 | 56/220 |
| 2009/0025354 A1 * | 1/2009 | Guldenpfennig | A01D 45/021 | 56/119 |
| 2013/0081369 A1 * | 4/2013 | Zhu | A01D 45/028 | 56/53 |
| 2014/0075909 A1 * | 3/2014 | Bomleny | A01D 41/144 | 56/119 |
| 2014/0090347 A1 | 4/2014 | Peden | | |
| 2016/0066508 A1 * | 3/2016 | Van Vooren | A01D 41/144 | 56/12.7 |
| 2016/0242357 A1 * | 8/2016 | Mastalir | A01D 51/005 | |

FOREIGN PATENT DOCUMENTS

| | | |
|---|---|---|
| DE | 102006056436 A1 | 5/2008 |
| WO | 2008/059354 A1 | 5/2008 |

\* cited by examiner

DEVICE FOR PICKING UP HARVESTED ROOT CROP

CROSS-REFERENCE TO RELATED APPLICATIONS

The present application is a non-provisional application claiming the benefit of European Patent Application 14306373.3, filed Sep. 5, 2014, which is incorporated herein by reference in its entirety.

FIELD OF THE INVENTION

The present invention refers to a pick-up arrangement according to claim 1 and a pick-up machine according to claim 10.

BACKGROUND OF INVENTION

Pick-up machines for picking up sugar beets are known in the state of the art. EP 2 172 093 discloses a pick-up arrangement having a pick-up device with pick-up rollers. This state of the art comprises also pick-up arrangements having a guiding device adapted to guide sugar beets located outside the pick-up within the pick-up opening. The known guiding devices are generally a guiding plate extending laterally outside the pick-up device frame. The known device allows picking up sugar beets that are arranged on a heap having a width of utmost 10 meters. In case the heap is larger than 10 meters, it is necessary to load the sugar beets onto trucks using wheel loader.

SUMMARY OF INVENTION

The invention seeks to improve the known pick-up arrangement so as to allow picking up harvested crop which is on a heap larger than 10 meters in particular up to 13 meters.

This problem is solved by the pick-up arrangement according to claim 1.

Thanks to the fact that the guiding device comprises a guiding member rotatably mounted and adapted to transport harvested crops, the harvested crops are actively transported towards the pick-up opening.

The dependent claims state advantages features of the invention.

The guiding device comprises at least a second guiding member (44) extending outside the pick-up width, being rotatably mounted with respect to the guiding device frame (40), and being adapted to transport harvested crops located outside the pick-up width into the pick-up opening. This allows an even more efficient introduction of crop into the pick-up section.

The pick-up arrangement comprises mounting means (50) fixing the guiding device (24) with respect to the pick-up device, and the mounting means are adapted for amending the position, in particular the angular position, of the guiding device with respect to the pick-up device (22), in particular the mounting means comprising a hinge (52) linking the guiding device to the pick-up device and/or a hydraulic cylinder (54). This allows adapting the position of the guiding device as a function of the width of the crop heap.

The mounting means define an active position of the guiding device (24) with respect to the pick-up device (22) in which the guiding device is located outside the projection of the pick-up opening in the pick-up direction PD thus allowing guiding harvested crop located outside the pick-up width into the pick-up opening and an inactive position of the guiding device with respect to the pick-up device, in which the guiding device is located inside a projection of the pick-up opening in the pick-up direction (PD). This allows storing the guiding device for road travel of the pick-up machine.

The mounting means are adapted for disconnecting the guiding device (24) from the pick-up device (22). This allows using the pick-up device alone in case the width of the crop heap is not bigger than the pick-up width of the pick-up device.

The guiding device comprises guiding device drive means (60) adapted to drive the or each guiding member in rotation, and in particular the guiding device drive means are arranged on a side of the or each guiding member (42, 44) opposite the pick-up device. This allows for better transport of the crops into the pick-up section.

The pick-up device comprises a pick-up driving device (70) having a pick-up driving device motor (72), in particular a hydraulic motor, the guiding device drive means (60) comprise a guiding device drive motor (62) and the pick-up driving device motor (72) and the guiding device drive motor (62) are connected to the same driving energy source, in particular are connected to the same hydraulic line as driving energy source. This allows for a simple construction of the pick-up device.

The or each guiding member is a transport screw adapted to transport the harvested crops towards the pick-up opening. This allows for particularly simple construction.

The transport screw has a lead which is comprised between 80 and 400 mm and/or an external diameter which is comprised between 100 and 250 mm and/or the radial height of the thread is comprised between 20 and 50 mm. These dimensions allow efficient guidance of the crops into the pick-up section.

The invention also comprises a pick-up machine according to claim 10. In case that each lateral section is a pick-up arrangement according to claims 1 to 9, the possible pick-up width is large for a given dimension of the pick-up machine.

BRIEF DESCRIPTION OF THE DRAWINGS

The invention will be explained in the following description referring to the annexed figures. All of the disclosed features alone or in any possible combination are part of the invention.

DETAILED DESCRIPTION OF INVENTION

Figure 1:
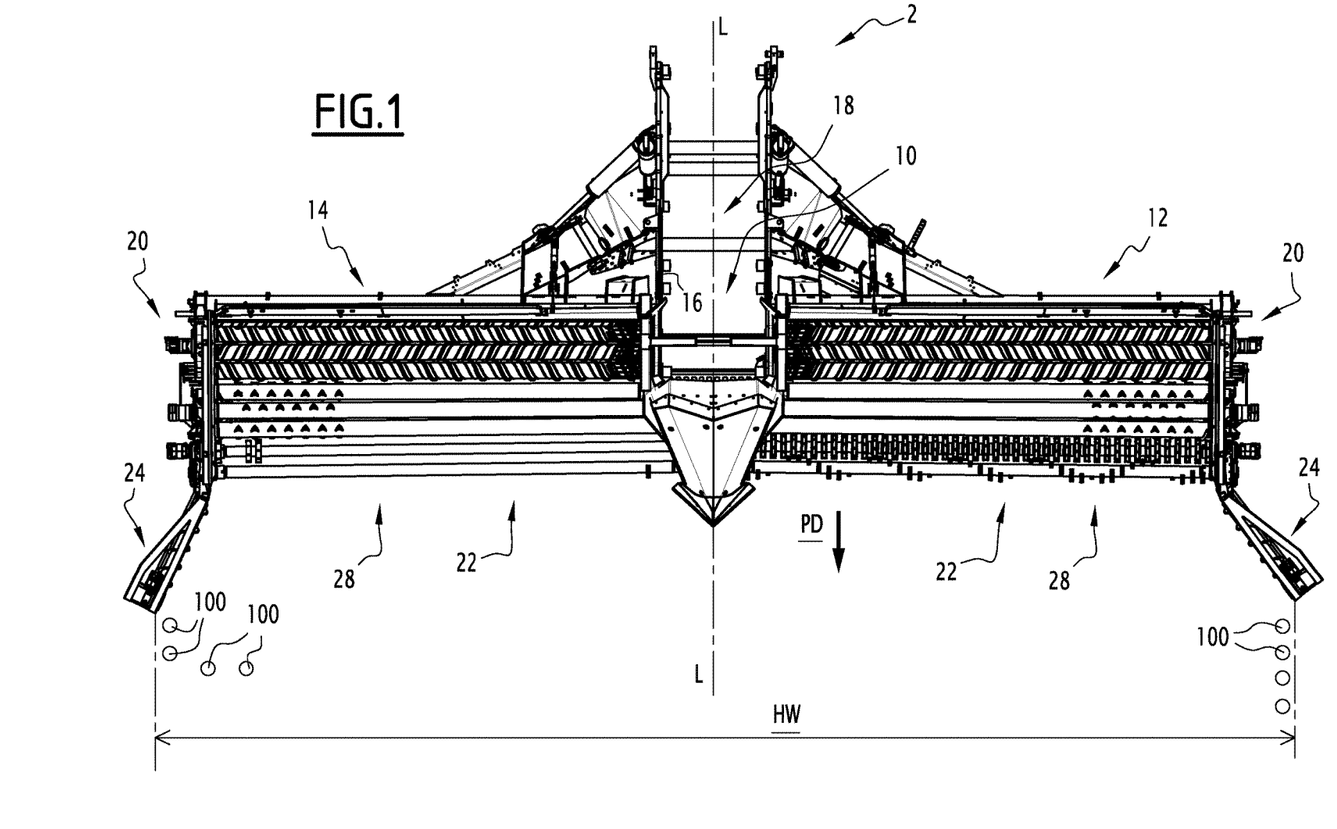
FIG. 1 a plan view of a pick-up machine for harvested crops according to the invention.

FIG. 1 shows a pick-up machine for harvested crops according to the invention and designated by reference 2.

The pick-up machine 2 is adapted for picking up harvested crops 100, in particular root crops and preferably sugar beets. The pick-up machine 2 is used for picking up the harvested crops, cleaning the crops, and transferring the cleaned crops onto a truck.

The harvested crops 100 are piled on a heap having a heap width HW.

The pick-up machine 2 comprises a center section 10 and two lateral sections 12 and 14.

The center section 10 has a center section frame 16 and a crop conveyor 18, such as a conveyor belt adapted to take up the crop picked-up by the lateral sections 12, 14 and for example to convey it to a truck.

The lateral sections 12 and 14 are identical, but are mirrored one with respect to the other along a central longitudinal plane of the pick-up machine 2. In the following, only the lateral section 12 will be described, the lateral section 14 being identical but mirrored.

Figure 2:
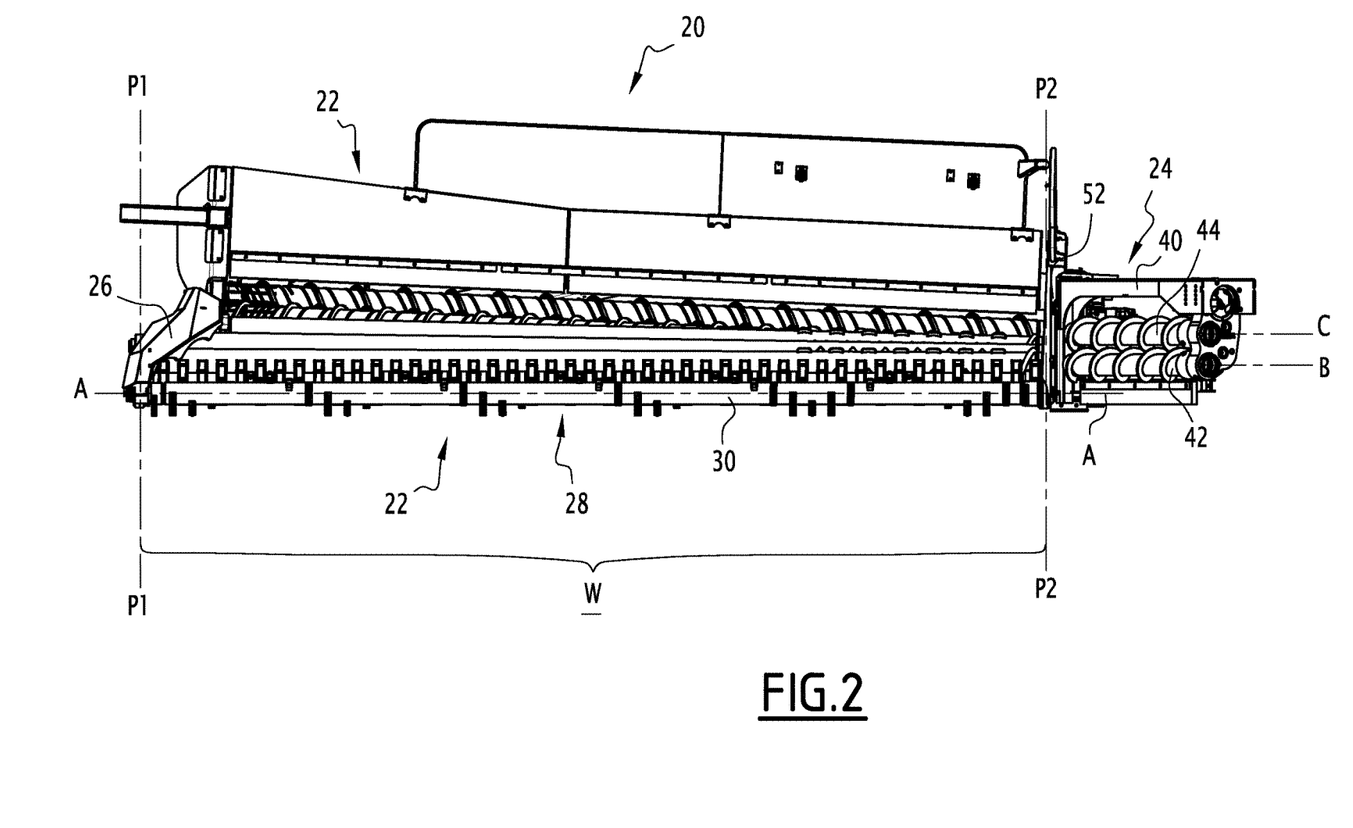
FIG. 2 a front view of a lateral section of the pick-up machine of FIG. 1 which represents a pick-up arrangement according to the invention.

The lateral section 12 is a pick-up arrangement 20 for picking up harvested crop, in particular root crops, preferably sugar beets 100. The pick-up arrangement 20 comprises a pick-up device 22 and a guiding device 24.

The pick-up device 22 defines a pick-up direction PD which is the direction of displacement of the pick-up device 22 during picking up and is generally the driving direction of the pick-up machine 2.

Figure 3:
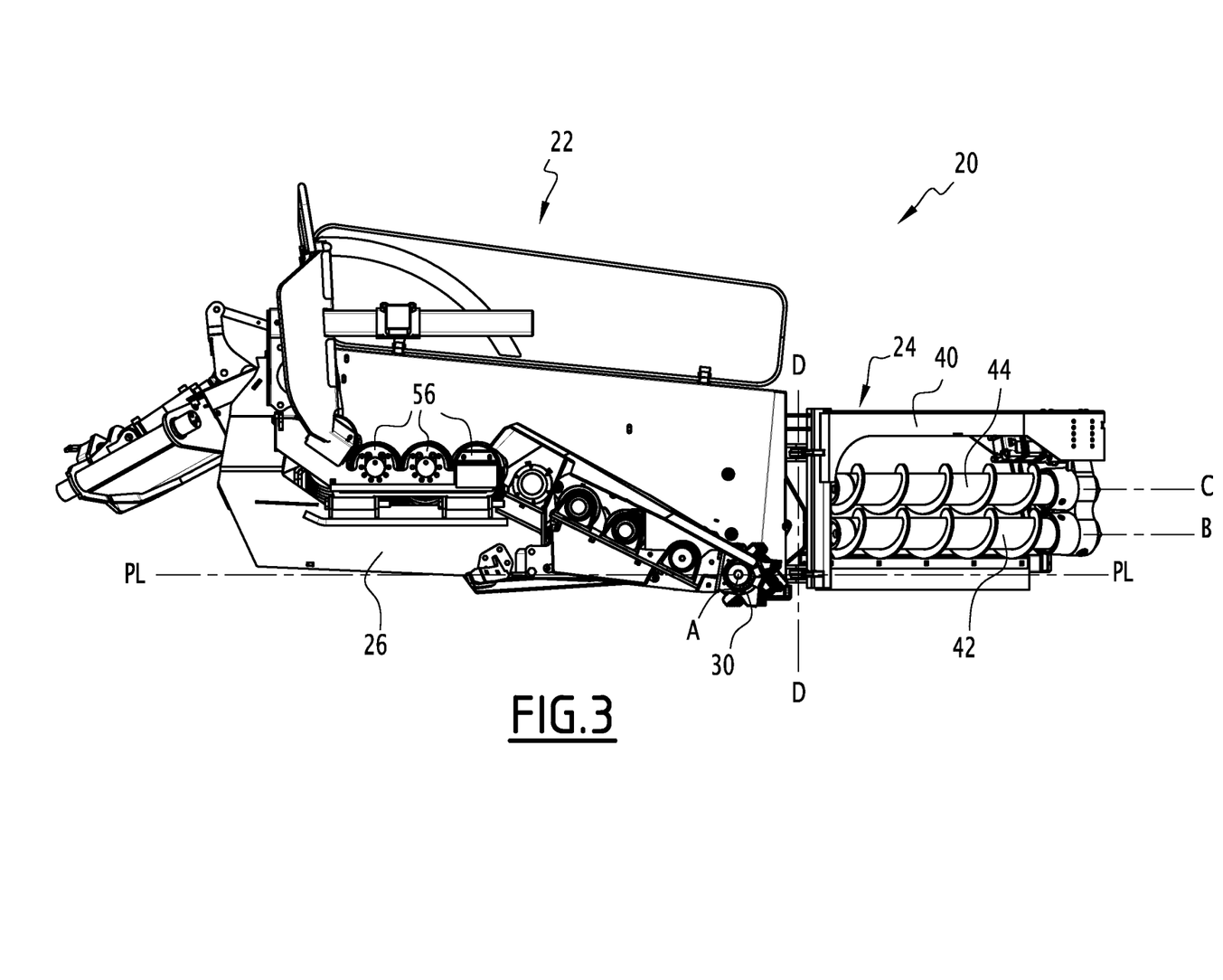
FIG. 3 a lateral view of the pick-up arrangement of FIG. 2.

The pick-up device 22 comprises a pick-up device frame 26 defining a pick-up opening 28 located on a pick-up side of the pick-up device. The pick-up device 22 comprises also a pick-up member 30 which is a roller mounted rotatable with respect to the pick-up device frame 26 around an axis A-A. The pick-up member 30 is located on the pick-up side of the frame 26 and adapted to pick up the harvested crop. The pick-up member 30 defines a pick-up width W which is generally the axial length of the pick-up member 30. The pick-up device 22 comprises furthermore a cleaning roller 32, conveyer and distribution rollers 34 and cleaning rollers 36.

The pick-up device 22 defines a pick-up plane PL which comprises the axis A-A of the pick-up member 30 and which is during picking-up parallel to the ground level on which the harvested crops are located.

Figure 5:
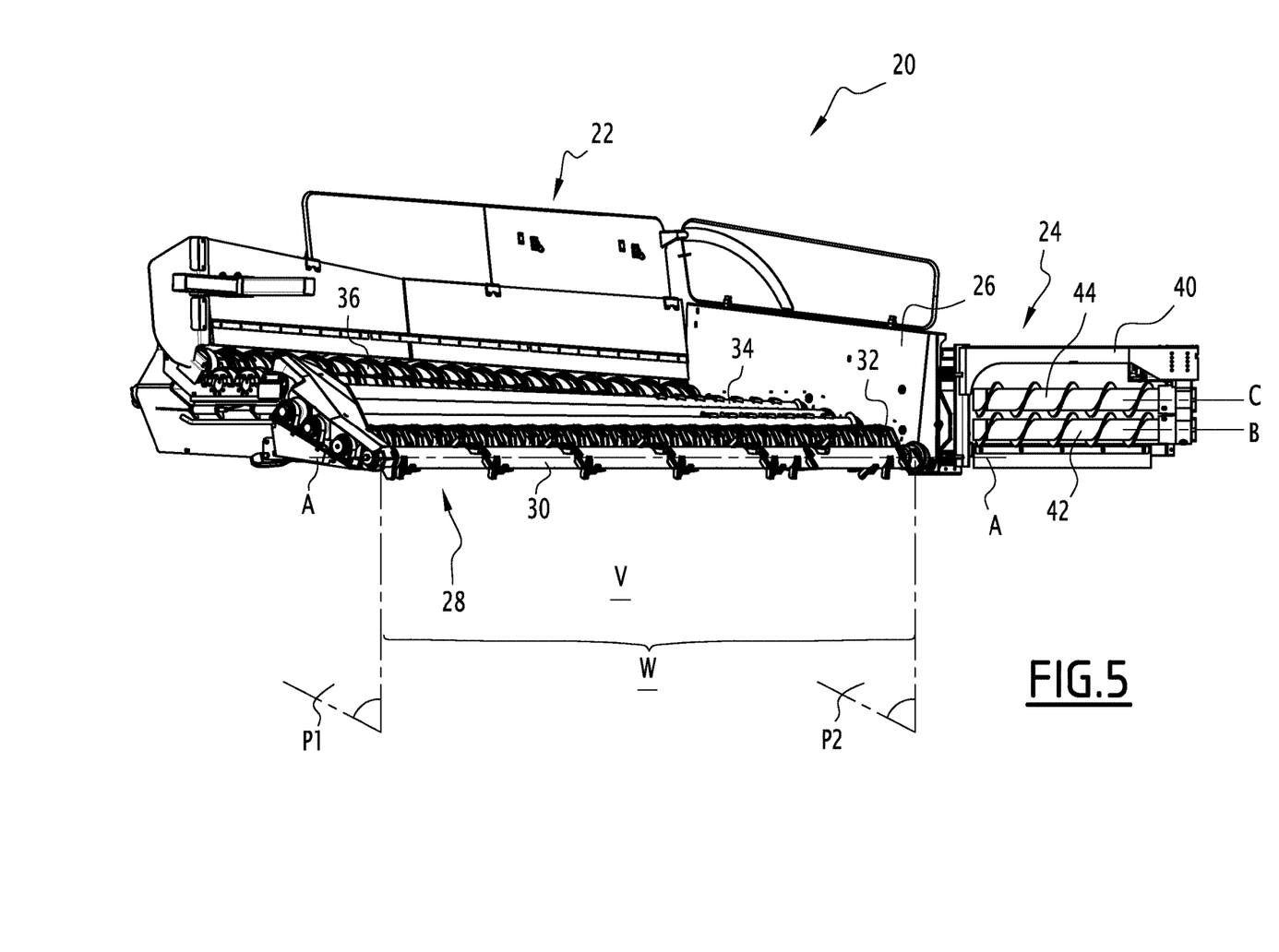
FIG. 5 an oblique view of the pick-up arrangement with a frontal view of the guiding device.

The guiding device 24 is adapted to guide harvested crop located outside the pick-up width W into the pick-up opening 28. The guiding device 24 comprises a guiding device frame 41, a first guiding member 42 and a second guiding member 44.

Figure 4:
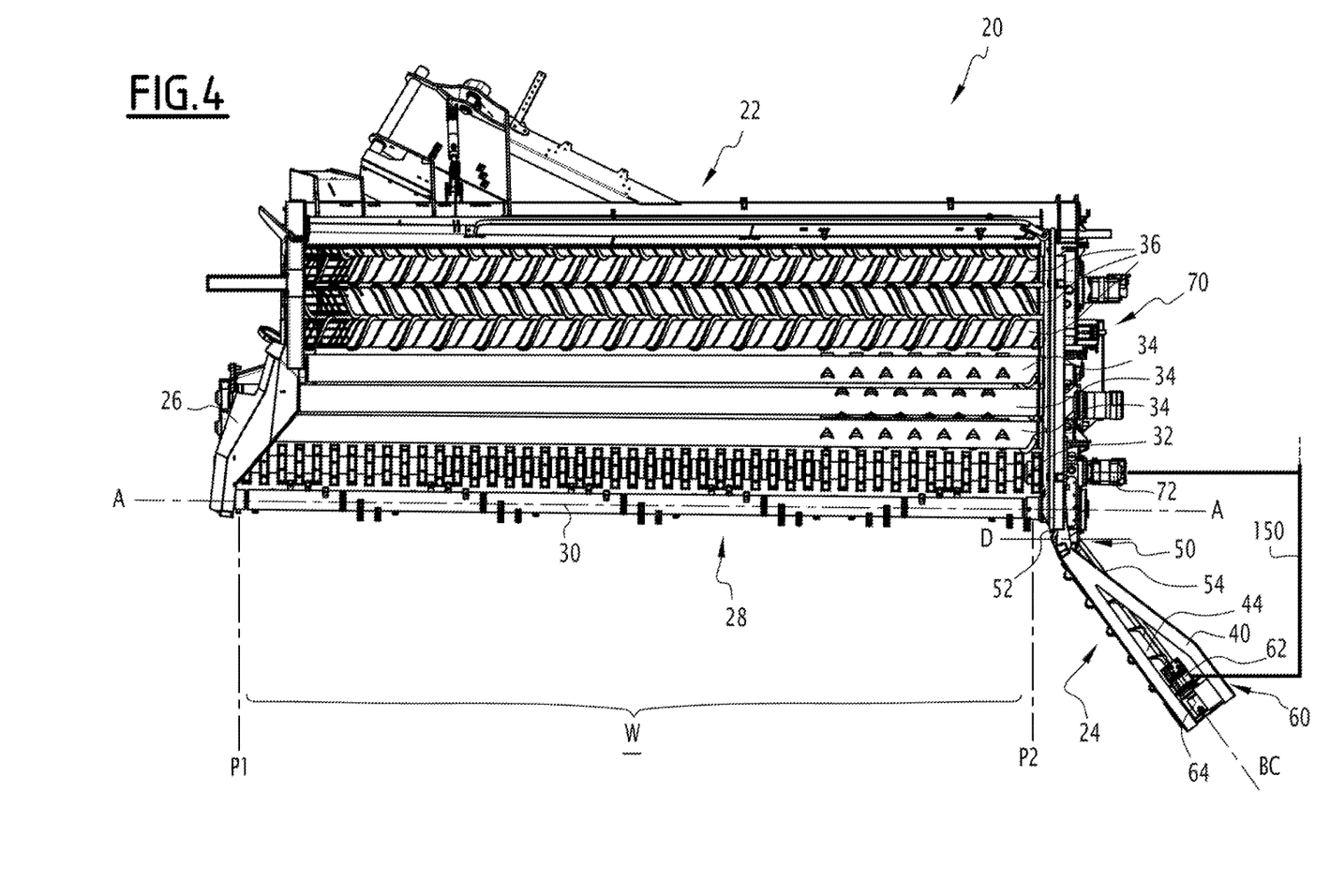
FIG. 4 a plan view of the pick-up arrangement of FIG. 2.

The first guiding member 42 and the second guiding member 44 extend outside the pick-up width W. This means that the respective first and second guiding member 42, 44 are located completely outside a volume V that is enclosed by two parallel planes P1 and P2, perpendicular to the axis A-A and located at both extremities of the pick-up member 30. Each first and second guiding member 42, 44 is therefore located so as to contact harvested crop that is exclusively outside the trajectory of the pick-up member 30 when the device is displaced in the pick-up direction PD.

The first guiding member 42 is mounted rotatably with respect to the guiding device frame 40 around an axis B-B and the second guiding member 44 is rotatably mounted with respect to the guiding device frame 40 around an axis C-C. Axes B-B and C-C are generally parallel to the pick-up plane PL.

Each guiding member 42, 44 is adapted to transport harvested crop located outside the pick-up width into the pick-up opening 28, when the harvested crop forms a heap having a width larger than the pick-up width W.

The pick-up arrangement 20 comprises furthermore mounting means 50, fixing the guiding device 24 with respect to the pick-up device 22. The mounting means 50 are adapted for amending the position of the guiding device with respect to the pick-up device.

The mounting means 50 comprise a hinge 52 linking the guiding device to the pick-up device. The mounting means 50 comprise furthermore an actuator, for example a hydraulic cylinder 54, adapted to move the guiding device 24 around the axis D-D of the hinge 52 into different positions and adapted to fix the guiding device 24 in these different positions.

The mounting means 50 define also an active position of the guiding device 24 with respect to the pick-up device 22 in which the guiding device is located outside the projection of the pick-up opening 28 in the pick-up direction PD. In this active position the guiding device allows guiding harvested crop located outside the pick-up width within the pick-up opening 28. In other terms, in the active position, the guiding device 24 is located outside the aforementioned volume V defined by the planes P1 and P2. This active position is shown in FIGS. 2 to 5.

The mounting means 50 define also an inactive position of the guiding device 24 with respect to the pick-up device 22 in which the guiding device 24 is located inside a projection of the pick-up opening 28 in the pick-up direction PD. In other terms, in the inactive position of the guiding device, the guiding device 24 is located at least partially inside the aforementioned volume V defined by the planes P1 and P2.

In a non-represented variant, the mounting means 50 are adapted to adapt the translational position of the guiding device 24 with respect to the pick-up device 22 in the direction of the axis D-D. Thus the operational height of the guiding device with respect to the pick-up device can be set.

The mounting means 50 are adapted for disconnecting the guiding device 24 from the pick-up device 22. Therefore, in case the guiding device is not needed, for example in case the width of the harvested crop heap is smaller than the pick-up width W, it can be disconnected and the pick-up device 22 can be used without the guiding device. Also, the guiding device 24 can be replaced with a guiding plate (not shown) in case the width of the harvested crop heap has a width only slightly larger than the pick-up width.

The guiding device 24 comprises guiding device drive means 60 adapted to drive each guiding member 40, 42 in rotational motion around its respective axis of rotation B-B or C-C. The guiding device drive means 60 comprise a motor 62 and a transmission 64.

The guiding device drive means 60 are arranged on the side of the or each guiding member 42, 44 opposite the pick-up device 22. In this case, the guiding device drive means advantageously do not hinder the guidance of the harvested crop into the pick-up opening 28.

The pick-up device 22 comprises furthermore a pick-up driving device 70 having a motor 72 for driving the pick-up member 30. The motors 62 and 72 are a hydraulic motor.

Advantageously, the motor 62 for driving the guide members and the motor 72 for driving the pick-up device are connected to the same hydraulic line as driving energy source. Therefore, there is no need for installing an extra control device for the guiding device and the rotational speed of the guide members 42 and 44 is automatically adapted to the drive speed of the pick-up member 30.

Each guiding member 42, 44 is preferably a transport screw adapted to transport the harvested crop towards the pick-up opening 28. Each transport screw has advantageously a lead which is comprised between 80 mm and 400 mm and/or an external diameter which is comprised between 100 mm and 250 mm and/or the radial height of the thread is comprised between 20 mm and 50 mm. The axial length of the guiding member 42, 44 is preferably between 700 mm and 1500 mm. In any case, the axial length of the guiding member 42, 44 is smaller than the axial length of the pick-up member 30. The axial length of the or each guiding member 42, 44 can be comprised between 20% and 50% of the axial length of the pick-up member 30.

The pick-up device comprises furthermore pick-up drive means 74 driving the pick-up member 30, the pick-up drive means being arranged on a lateral side of the pick-up device frame 26.

The pick-up arrangement according to the invention allows picking-up crops that are on a heap having a large width.

Furthermore, the guiding operation, thanks to the specific features of the invention, results in little damage of the crops.

Also, the pick-up arrangement is flexible in use and can be retrofitted to existing pick-up machines.

What is claimed is:

1. A pick-up arrangement for picking up harvested root crop, the pick-up arrangement comprising:
    a pick-up device that comprises a pick-up device frame defining a pick-up opening located on a pick-up side of the pick-up device, and wherein pick-up device defines a pick-up direction;
    a pick-up member located on the pick-up side of the pick-up device, wherein the pick-up member is roller mounted rotatable with respect to the pick-up device frame around a pick-up member axis and the pick-up member is adapted and configured to pick-up harvested root crop and the pick-up member defines a pick-up width equal to the pick-up member's axial length; and
    a guiding device adapted and configured to guide harvested root crop located outside the pick-up width into the pick-up opening, wherein the guiding device comprises a guiding device frame and a first guiding member extending outside the pick-up width, wherein the first guiding member is rotatably mounted with respect to the guiding device frame around a first guiding member axis and the first guiding member is adapted and configured to transport harvested root crop located outside the pick-up width into the pick-up opening, and wherein the first guiding member is a transport screw adapted to transport the harvested root crop towards the pick-up opening;
wherein the pick-up device defines a pick-up plane that comprises the pick-up member axis and that is parallel to the ground on which the harvested root crop is located and wherein the first guiding member axis is generally parallel to the pick-up plane.

2. The pick-up arrangement of claim 1, wherein the guiding device further comprises at least a second guiding member extending outside the pick-up width, wherein the second guiding member is rotatably mounted with respect to the guiding device frame and is adapted to transport harvested root crop located outside the pick-up width into the pick-up opening.

3. The pick-up arrangement of claim 1 further comprising a mounting means for fixing the guiding device with respect to the pick-up device, wherein the mounting means is adapted for adjusting the angular position of the guiding device with respect to the pick-up device, wherein the mounting means comprises a hinge linking the guiding device to the pick-up device or a hydraulic cylinder.

4. The pick-up arrangement of claim 3, wherein the mounting means defines an active position of the guiding device with respect to the pick-up device, wherein the active position of the guiding devices is located outside a projection of the pick-up opening in the pick-up direction thereby guiding harvested root crop located outside the pick-up width into the pick-up opening; and an inactive position of the guiding device with respect to the pick-up device, wherein the inactive position of the guiding device is located inside the projection of the pick-up opening in the pick-up direction.

5. The pick-up arrangement of claim 3, wherein the mounting means is adapted for disconnecting the guiding device from the pick-up device.

6. The pick-up arrangement of claim 1, wherein the guiding device further comprises a guiding device drive means adapted to drive the guiding member in rotation, wherein the guiding device drive means is on a side of the guiding member that is opposite the pick-up device.

7. The pick-up arrangement of claim 6, wherein:
    the pick-up device further comprises a pick-up driving device that comprises a pick-up driving device motor that is hydraulically driven; and
    the guiding device drive means further comprises a guiding device drive motor that is hydraulically driven;
wherein the pick-up driving device motor and the guiding device drive motor are connected to a hydraulic line that delivers hydraulic fluid to both motors.

8. The pick-up arrangement of claim 1, wherein the transport screw has a lead that is between 80 mm and 400 mm, an external diameter that is between 100 mm and 250 mm, and a radial height of the thread that is between 20 mm and 50 mm.

9. The pick-up arrangement of claim 1, wherein the root crop is sugar beets.

10. A pick-up machine for harvested root crop, the pick-up machine comprising:
    a center section that comprises a center section frame and a conveyor for conveying picked-up harvested root crop; and
    two lateral sections wherein each lateral section is a pick-up arrangement for picking up harvested root crop, wherein the pick-up arrangement comprises:
        a pick-up device that comprises a pick-up device frame defining a pick-up opening located on a pick-up side of the pick-up device, and wherein pick-up device defines a pick-up direction;
        a pick-up member located on the pick-up side of the pick-up device, wherein the pick-up member is roller mounted rotatable with respect to the pick-up device frame around a pick-up member axis and the pick-up member is adapted and configured to pick-up harvested root crop and the pick-up member defines a pick-up width equal to the pick-up member's axial length; and
        a guiding device adapted and configured to guide harvested root crop located outside the pick-up width into the pick-up opening, wherein the guiding device comprises a guiding device frame and a first guiding member extending outside the pick-up width, wherein the first guiding member is rotatably mounted with respect to the guiding device frame around a first guiding member axis and the first guiding member is adapted and configured to transport harvested root crop located outside the pick-up width into the pick-up opening;
wherein the pick-up device defines a pick-up plane that comprises the pick-up member axis and that is parallel to the ground on which the harvested root crop is located and wherein the first guiding member axis is generally parallel to the pick-up plane.

11. The pick-up machine of claim 10, wherein the guiding device further comprises at least a second guiding member extending outside the pick-up width, wherein the second guiding member is rotatably mounted with respect to the guiding device frame around a second guiding member axis and the second guiding member is adapted and configured to transport harvested root crop located outside the pick-up width into the pick-up opening, wherein the second guiding member axis is generally parallel to the pick-up plane.

12. The pick-up machine of claim 11, wherein the pick-up arrangement further comprises a mounting means for fixing the guiding device with respect to the pick-up device, wherein the mounting means is adapted for adjusting the angular position of the guiding device with respect to the pick-up device, and wherein the mounting means comprises a hinge linking the guiding device to the pick-up device or a hydraulic cylinder.

13. The pick-up machine of claim 12, wherein the mounting means defines an active and an inactive position of the guiding device with respect to the pick-up device, wherein the active position of the guiding device is located outside a projection of the pick-up opening in the pick-up direction thereby guiding harvested root crop located outside the pick-up width into the pick-up opening and the inactive position of the guiding device is located inside the projection of the pick-up opening in the pick-up direction.

14. The pick-up machine of claim 12, wherein the mounting means is adapted for disconnecting the guiding device from the pick-up device.

15. The pick-up machine of claim 11, wherein the guiding device further comprises a guiding device drive means adapted to drive the guiding member in rotation, wherein the guiding device drive means is on a side of the guiding member that is opposite the pick-up device.

16. The pick-up machine of claim 15, wherein:
the pick-up device further comprises a pick-up driving device that comprises a pick-up driving device motor that is hydraulically driven; and
the guiding device drive means further comprises a guiding device drive motor that is hydraulically driven;
wherein the pick-up driving device motor and the guiding device drive motor are connected to a hydraulic line for delivering hydraulic fluid to both motors.

17. The pick-up machine of claim 11, wherein the first and second guiding members are transport screws adapted to transport the harvested root crop towards the pick-up opening.

18. The pick-up machine of claim 17, wherein the transport screw has a lead that is between 80 mm and 400 mm, an external diameter that is between 100 mm and 250 mm, and a radial height of the thread that is between 20 mm and 50 mm.

* * * * *